(12) United States Patent
Browning et al.

(10) Patent No.: US 6,918,023 B2
(45) Date of Patent: Jul. 12, 2005

(54) METHOD, SYSTEM, AND COMPUTER PROGRAM PRODUCT FOR INVALIDATING PRETRANSLATIONS FOR DYNAMIC MEMORY REMOVAL

(75) Inventors: Luke Matthew Browning, Austin, TX (US); Bruce G. Mealey, Austin, TX (US); Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 10/262,176

(22) Filed: Sep. 30, 2002

(65) Prior Publication Data

US 2004/0064669 A1 Apr. 1, 2004

(51) Int. Cl.[7] .............................................. G06F 12/00
(52) U.S. Cl. ...................... 711/202; 711/203; 711/204; 711/205; 711/206
(58) Field of Search ......................... 711/202–206, 154; 710/571

(56) References Cited

U.S. PATENT DOCUMENTS

| | | | | |
|---|---|---|---|---|
| 6,304,951 | B1 | 10/2001 | Mealey et al. | 711/206 |
| 6,587,933 | B2 * | 7/2003 | Crockett et al. | 711/154 |
| 6,615,300 | B1 * | 9/2003 | Banning et al. | 710/100 |
| 6,651,132 | B1 * | 11/2003 | Traut | 711/6 |
| 6,654,866 | B2 * | 11/2003 | Hagersten et al. | 711/205 |
| 6,760,786 | B2 * | 7/2004 | Hagersten | 710/5 |
| 6,785,886 | B1 * | 8/2004 | Lim et al. | 718/1 |

OTHER PUBLICATIONS

"Lazy TLB consistency for large–scale multiprocessors", Moon–Seek Chang; Kern Koh; Parallel Algorithms/Architecture Synthesis, 1997. Proceedings. Second Aizu International Symposium , Mar. 17–21, 1997. pp.: 308–315.*

* cited by examiner

Primary Examiner—T Nguyen
(74) Attorney, Agent, or Firm—Duke W. Yee; Mark E. McBurney; James O. Skarsten (57) ABSTRACT

A system, method, and computer program product are disclosed for invalidating specified pretranslations maintained in a data processing system which maintains decentralized copies of pretranslations. A centralized mapping of virtual addresses to their associated physical addresses is established. The centralized mapping includes a listing of pretranslations of the virtual addresses to their associated physical addresses. Multiple lists of pretranslations are generated. Control of the lists may be passed from one entity to another, such that the lists are not owned by any particular entity. Each one of the lists includes a copy of pretranslations for virtual addresses. A particular one of the physical addresses is specified. Each list that includes a pretranslation of a virtual address to the specified physical addresses is located. The pretranslation of the virtual address to the specified physical address is then invalidated within each one of the lists.

57 Claims, 5 Drawing Sheets

METHOD, SYSTEM, AND COMPUTER PROGRAM PRODUCT FOR INVALIDATING PRETRANSLATIONS FOR DYNAMIC MEMORY REMOVAL

BACKGROUND OF THE INVENTION

1. Technical Field

The present invention relates generally to the field of computer systems, and more specifically to a data processing system, method, and computer program product for invalidating virtual to physical memory pretranslations during dynamic memory removal.

2. Description of Related Art

Personal computer systems are well known in the art. They have attained widespread use for providing computer power to many segments of today's modern society. Personal computers may be defined as desktop systems, floor standing systems, or portable microcomputers. Examples of such personal computer systems are IBM's PC series, Aptiva series, and Thinkpad series.

Many computer systems include a virtual memory address space which permits an application or process to address a space which is larger than the main memory included within the system. In virtual memory systems, it is necessary to translate virtual addresses into physical addresses, also called real addresses, in order to execute commands. One common method for performing the translations is to perform a page table look-up.

To translate is the process of looking up from a centralized record the physical address to which a particular virtual address is mapped. Thus, a pretranslation is obtained using the centralized record. A pretranslation is a copy of the translation. The pretranslation may be stored, such as with a virtual buffer, for later use in order to avoid the process of translation.

The virtual address space is typically divided into equal sized pages. A page table is maintained which includes a physical address for the first byte of main memory for each page of the virtual address space. The page table is stored in main memory and is accessed each time a virtual address is included within a command. In this manner, each time a virtual address is encountered, the physical address must be determined.

Some virtual memory systems utilize a descriptor-based addressing scheme. In a descriptor-based addressing scheme, a memory descriptor accompanies the virtual buffer. The descriptor includes a list of pretranslations of this virtual buffer's virtual addresses to physical addresses. In these systems, multiple copies of a virtual-to-physical pretranslation may exist. A copy of the same pretranslation may appear in the memory descriptor for many different virtual buffers.

In a system using memory descriptors, there may be many different copies of a pretranslation of a virtual page to a real, or physical, page. When these pretranslations change, such as when a physical page is migrated from its original page to another physical page, these pretranslations change. The pretranslations may be rendered invalid. In a memory descriptor system, an invalid pretranslation may appear in multiple, different memory descriptors.

Therefore, a need exists for a method, system, and computer program product for invalidating pretranslations in systems maintaining multiple copies of virtual-to-physical pretranslations.

SUMMARY OF THE INVENTION

A system, method, and computer program product are disclosed for invalidating specified pretranslations maintained in a data processing system which maintains decentralized copies of pretranslations. A centralized mapping of virtual addresses to their associated physical addresses is established. The centralized mapping includes a listing of translations of the virtual addresses to their associated physical addresses. Multiple lists of pretranslations are generated which are utilized throughout the data processing system and which are not owned by any particular process. Control of the lists may be passed from one entity to another, such that the lists are not owned by any particular entity. Each one of the lists includes a copy of pretranslations for a particular set of virtual addresses. A particular one of the physical addresses is then specified. Each list that includes a pretranslation of a virtual address to the specified physical addresses is located. The pretranslation of the virtual address to the specified physical address is then invalidated within each one of the lists.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is related to the subject matter of U.S. Pat. No. 6,304,951 B1 issued on Oct. 16, 2001, to Mealey, incorporated herein in its entirety by reference.

The present invention is a method, system, and computer program product for invalidating specified pretranslations of virtual to physical addresses. A centralized list of mappings of virtual addresses to physical addresses is maintained by a virtual memory manager. In addition to this centralized list, other lists of pretranslations are also stored distributed throughout the system. These other lists include copies of the translations and are referred to herein as "RPN lists". An RPN list keeps a copy of selected virtual to physical address pretranslations. Thus, any combination of pretranslations may be maintained in an RPN list.

In this manner, many different copies of a translation of a virtual address to physical address may exist. Some of these pretranslations may be invalidated, such as when the physical address changes because a real page is migrated to a new real page. When this occurs, the pretranslations to the original real page are invalid. The present invention provides a method, system, and product for locating particular pretranslations, invalidating them, synchronizing the invalidation process with the memory remove process, and then repopulating these lists with the current, valid pretranslation.

Only those pretranslations in an RPN list that are affected by changes to real pages are invalidated. The other pretranslations in that list are not invalidated and may continue to be used. The present invention provides for invalidating pretranslations without the use of locks or semaphores.

The present invention provides for tracking lists of pretranslations by requiring that lists be either allocated by or registered with the kernel. In this manner, the kernel has knowledge of each list of pretranslations, its location within memory, and the pretranslations stored in each list.

In order to synchronize invalidation of pretranslations stored in these lists with a memory remove operation, a user of a pretranslation list first disables the user's processor's ability to respond to interprocessor interrupts. The user then accesses the list. Once the user has finished accessing the list, the user then re-enables the ability of its processor to respond to interprocessor interrupts. Thus, while the user is accessing a pretranslation list, the user's processor will not respond to interprocessor interrupts.

When the kernel begins a memory remove operation, it first transmits an interprocessor interrupt to the processors in the system. The kernel then waits for an acknowledgment of these interrupts before proceeding. While a user is accessing a pretranslation list, its processor will not respond to the interrupt. Thus, the memory remove operation must wait until the user has finished accessing a pretranslation list before the memory remove operation can proceed. In this manner, the memory remove operation and a user accessing a pretranslation will not interfere with each other.

During a memory remove operation, the pretranslations are invalidated that point to physical addresses that are affected by the memory remove. When a user encounters an invalid pretranslation when accessing a list, the user will determine a current virtual to physical pretranslation, and then store that pretranslation in the list.

A pretranslation list, also called a real page number (RPN) list, includes pretranslations for a particular set of virtual addresses. Multiple different RPN lists may exist. Each RPN list may include a list of different sets of virtual addresses. A pretranslation of a particular virtual address may exist in many different places. The association of the virtual address with its real, or physical address will exist in the centralized location within the virtual memory manager. In addition, many other pretranslations of this particular virtual address may exist within many different RPN lists.

The RPN lists are private copies of virtual to physical translations. The lists are maintained in memory descriptors that are associated and maintained with virtual buffers. Pointers to virtual buffers may be passed from one entity to another. When a pointer to a virtual buffer is passed from one entity to another, control of the RPN list included in the buffer's descriptor is thus passed from one entity to another. In this manner, the lists are not owned by any particular entity. An entity may be a software process, such as a routine, application, or operating system function, or it may be a subsystem.

Although a translation lookaside buffer (TLB) acts as a temporary local copy of a page table, a TLB is implemented in hardware and is controlled and owned by a particular CPU. Control of a TLB may not be passed from one entity to the next. Control of a TLB is maintained by a particular CPU.

Figure 1:
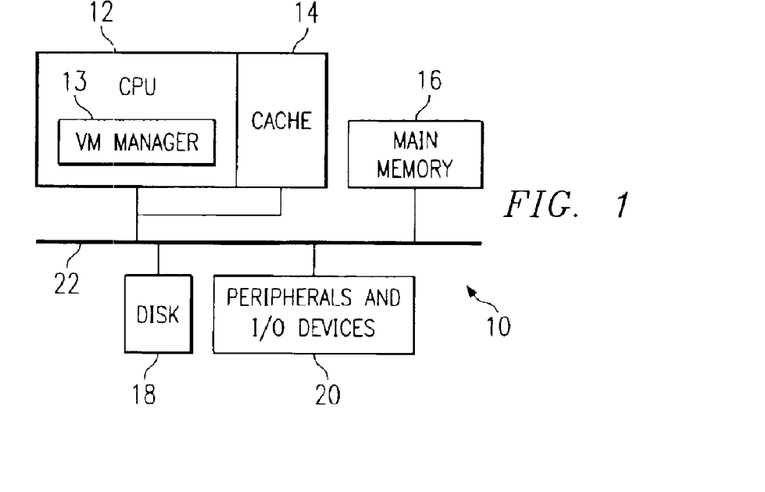
FIG. 1 is a pictorial representation which depicts a data processing system in which the present invention may be implemented.

FIG. 1 illustrates a pictorial representation of a data processing system which may be utilized to implement the present invention. Data processing system 10 may be implemented utilizing any type of computer system, such as a personal computer, mini-computer, or mainframe computer, suitably programmed to execute the methods and processes described below. Data processing system 10 includes a central processing unit 12 having a virtual memory manager 13 and an associated cache 14, a main memory 16, a disk 18, and other peripherals and/or input/output (I/O) devices 20 coupled together utilizing a bus 22. Devices 20 may include printers, plotters, a mouse, a joy stick, and/or other disks. Those skilled in the art will recognize that multiple data processing systems such as system 10 may be coupled together. In addition, data processing system 10 may include multiple processors.

Figure 2:
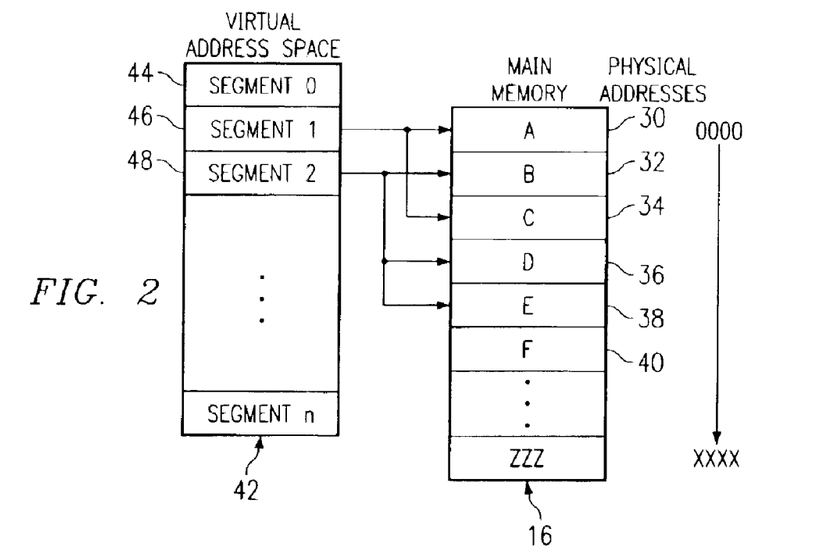
FIG. 2 depicts a pictorial representation of a main memory including a plurality of storage locations which are addressed utilizing a plurality of physical addresses, and a virtual address space which may be utilized by an application to address the main memory in accordance with the present invention.

FIG. 2 depicts a pictorial representation of a main memory including a plurality of storage locations which are addressed utilizing a plurality of physical addresses, and a virtual address space which may be utilized by an application to address the main memory in accordance with the method and system of the present invention. Data processing system 10 includes a virtual memory manager for permitting a user to address a virtual address space which is much larger than the number of storage locations included within main memory 16. In a preferred embodiment, data processing system 10 includes a descriptor-based memory addressing scheme.

In a descriptor-based memory addressing scheme, each process or command executed within system 10 utilizes a descriptor to address all components included within system 10. Components may include a main memory location, a group of several main memory locations, a disk location, a group of several disk locations, a subroutine, or any other type of data or program component which could be included within system 10. The descriptor describes to the virtual memory manager how to address a particular component in a virtual sense. The descriptor provides a virtual memory address for the particular component.

Main memory 16 includes a plurality of storage locations 30–40. A different physical address is utilized to address a particular storage location. For example, location 30 is addressed utilizing physical address "0000".

A virtual memory address space 42 is included within system 10. Virtual memory address space 42 is divided into a plurality of segments 44–48. The segments need not be a fixed size, and may include a collection of pages of virtual memory. Each segment will include a plurality of different virtual memory addresses. At any given time, each segment resides either in main memory 16 or within disk 18.

A region of main memory may be "pinned" by temporarily associating the region with a portion of the virtual memory address space. When a region of main memory is temporarily associated with a portion of the virtual memory, the region may be used only as the physical storage locations for the portion of the virtual memory. The portion of the virtual memory may include any size of the virtual memory. It may include one or more segments of virtual memory. When the temporary association between the region of main memory and the portion of virtual memory is removed, i.e. the region is unpinned, the region may again be used for any purpose.

In FIG. 2, a region of main memory 16 has been temporarily associated with segment 46 of the virtual memory. Segment 46 is temporarily associated with physical addresses 30 and 34. A region of main memory will often include discontiguous main memory storage locations. In addition, a second region of main memory 16 has been temporarily associated with segment 48. Segment 48 is temporarily associated with physical addresses 32, 36, and 38. Segment 44 is not temporarily associated with any region of main memory 16.

As each region of main memory 16 is pinned, a memory descriptor is generated. The memory descriptor includes information which indicates to the virtual memory manager how to address the region in a virtual sense. Therefore, each region will have an associated descriptor which includes a segment identifier (ID) of the virtual memory address space associated with the pinned region. The descriptor is associated with both the pinned region and the virtual memory segment for which it was pinned.

Figure 3A:
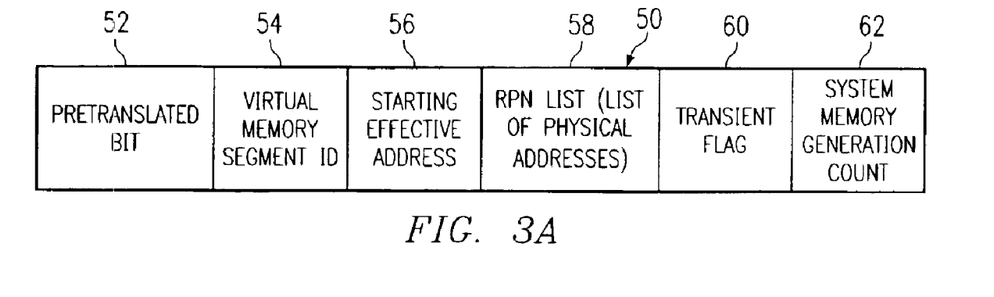
FIG. 3A illustrates a pictorial representation of a plurality of fields included within a memory descriptor in accordance with the present invention.

FIG. 3A illustrates a pictorial representation of a plurality of fields included within a memory descriptor in accordance with the method and system of the present invention. Memory descriptor 50 includes fields 52, 54, 56, 58, 60, 62, 64, and 66. Field 52 is utilized to store a pretranslation bit. If memory descriptor 50 includes the pretranslated physical addresses associated with the portion of the virtual memory associated with the descriptor, the bit stored in field 52 is set. Otherwise, the bit is cleared. Field 54 is utilized to store a virtual memory segment ID. An identifier of the portion of the virtual memory associated with descriptor 50 is stored in field 54. Field 56 includes the starting virtual address associated with this segment of the virtual memory. Field 58 is utilized to store a list of the physical storage locations in main memory 16 which are included within the region associated with descriptor 50.

A bit is stored in field 60 that indicates whether the RPN list 58 is transient. The list is transient when it is expected to be used only once, e.g. when there is only one expected I/O operation using this list. The list is not transient when it is expected to be used multiple different times for many I/O operations.

Field 62 includes a stored value for a system memory generation count. A system memory generation count is kept by the system. Each time particular types of memory operations are performed, this count is atomically incremented. When a list of pretranslations is created and stored in a memory descriptor, such as descriptor 50, the current value of the system memory generation count is stored in field 62. Later, the value stored in field 62 may be compared to the system memory generation count that is maintained by the kernel. If the stored value matches the kernel's value, no memory operation has been executed since the creation of the RPN list that is stored in field 58. If the stored value does not match the kernel's value, a memory operation has been executed since the creation of the RPN list that is stored in field 58.

Figure 3B:
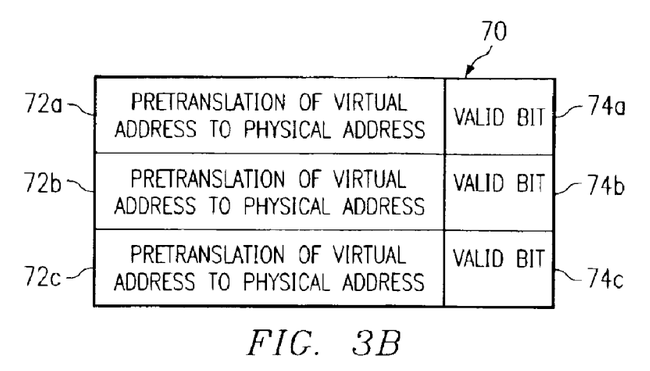
FIG. 3B depicts a pictorial representation of a list of pretranslations, i.e. a real page number (RPN) list, in accordance with the present invention.

FIG. 3B depicts a pictorial representation of a list of pretranslations in accordance with the present invention. An RPN list 70 is depicted, such as the list stored in field 58. The depicted list includes three entries. Each entry includes a pretranslation of a virtual address to a physical address, and a bit that indicates whether the pretranslation is valid. For example, the first entry includes a pretranslation 72a, and a valid bit 74a. The second entry includes a pretranslation 72b, and a valid bit 74b. And, the third entry includes a pretranslation 72c, and a valid bit 74c.

Figures 4, 5:
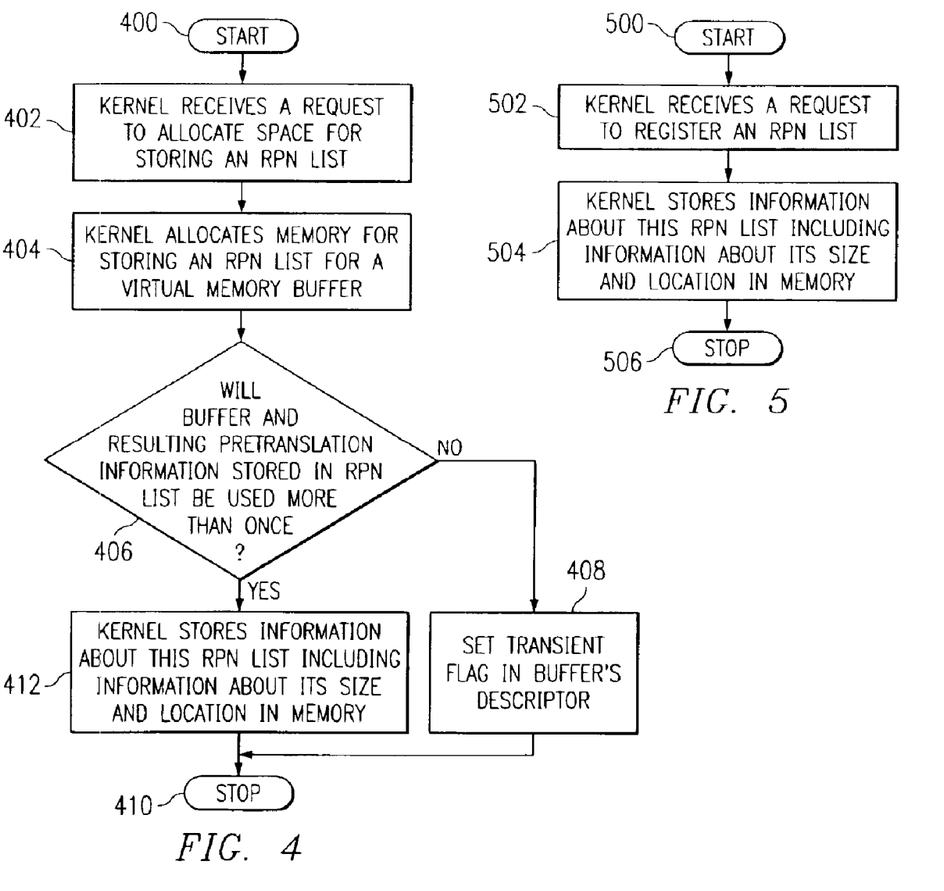
FIG. 4 illustrates a high level flow chart which depicts a kernel allocating memory for storing a pretranslation list in accordance with the present invention.
FIG. 5 depicts a high level flow chart which illustrates a kernel registering a pretranslation list in accordance with the present invention.

FIG. 4 illustrates a high level flow chart which depicts a kernel allocating memory for storing a pretranslation list in accordance with the present invention. The process starts as depicted by block 400 and thereafter passes to block 402 which illustrates the kernel receiving a request to allocate space for storing a pretranslation list, such as an RPN list. Next, block 404 depicts the kernel allocating memory for storing the RPN list for a virtual memory buffer. Thereafter, block 406 illustrates a determination of whether or not the buffer and resulting pretranslation information will be used more than once. If a determination is made that the buffer and pretranslation information will not be used more than once, the process passes to block 408 which depicts setting a transient flag in this buffer's descriptor that indicates that the buffer and pretranslation information is transient, i.e. will only be used once. The transient flag indicates whether the pretranslation information will be used more than once, i.e. whether there will be only one or multiple I/O transactions using this information. Transient pretranslations are not registered with the kernel. Transient pretranslations are globally invalidated by atomically incrementing the system memory generation count, forcing the generation count stored in the descriptor to become stale. The process then terminates as illustrated by block 412.

Referring again to block 406, if a determination is made that the buffer and pretranslation information will be used more than once, the process passes to block 412 which illustrates the kernel storing information about this RPN list, including information about its size and location in memory. By storing this information, the kernel knows about the presence of the pretranslations, as well as where those pretranslations are stored. The process then terminates as depicted by block 410.

FIG. 5 depicts a high level flow chart which illustrates a kernel registering a pretranslation list in accordance with the present invention. The process starts as illustrated by block 500 and thereafter passes to block 502 which depicts the kernel receiving a request to register an RPN list. Next, block 504 illustrates the kernel registering the list by storing information about the list, including information about the list's size and location in memory. The process then terminates as depicted by block 506.

Figure 6:
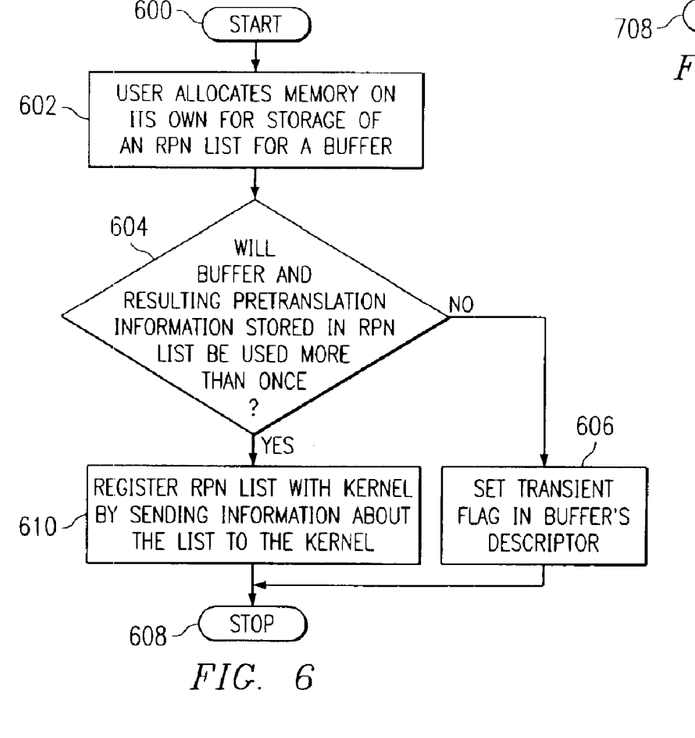
FIG. 6 illustrates a high level flow chart which depicts a user allocating memory for storing a pretranslation list in accordance with the present invention.

FIG. 6 illustrates a high level flow chart which depicts a user allocating memory for storing a pretranslation list in accordance with the present invention. The process starts as depicted by block 600 and thereafter passes to block 602 which illustrates a user, such as a routine, application, or service, allocating memory on its own, i.e. without the kernel, for storage of an RPN list. A user allocates memory on its own when it, and not the kernel, allocated the memory. Next, block 604 depicts a determination of whether or not the buffer and resulting pretranslation information will be used more than once. If a determination is made that the buffer and pretranslation information will not be used more than once, the process passes to block 606 which depicts setting a transient flag in this buffer's descriptor that indicates that the buffer and pretranslation information is transient. The process then terminates as illustrated by block 608.

Referring again to block 604, if a determination is made that the buffer and pretranslation information will be used more than once, the process passes to block 610 which illustrates registering the RPN list with the kernel by sending information about the list to the kernel. The information includes information about the list's size and location in memory. By storing this information, the kernel knows about the presence of the pretranslations, as well as where those pretranslations are stored. The process then terminates as depicted by block 608.

Figure 7:
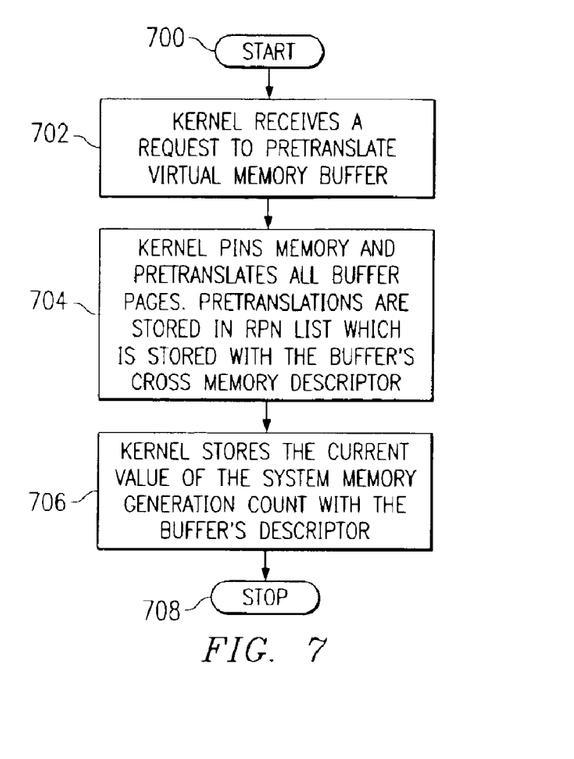
FIG. 7 depicts a high level flow chart which illustrates pretranslating virtual memory addresses to physical addresses in accordance with the present invention.

FIG. 7 depicts a high level flow chart which illustrates pretranslating virtual memory addresses to physical addresses in accordance with the present invention. The process starts as illustrated by block 700 and thereafter passes to block 702 which depicts the kernel receiving a request to pretranslate the virtual memory pages that make up a virtual memory buffer. Next, block 704 illustrates the kernel pinning memory and pretranslating all buffer pages. The pretranslations are stored in an RPN list which is stored with the buffer's memory descriptor. Block 706, then, depicts the kernel storing the current value of the system memory generation count with the buffer's descriptor. The system memory count tracks the number of times particular types of memory operations have been performed. The process then terminates as illustrated by block 708.

Figure 8:
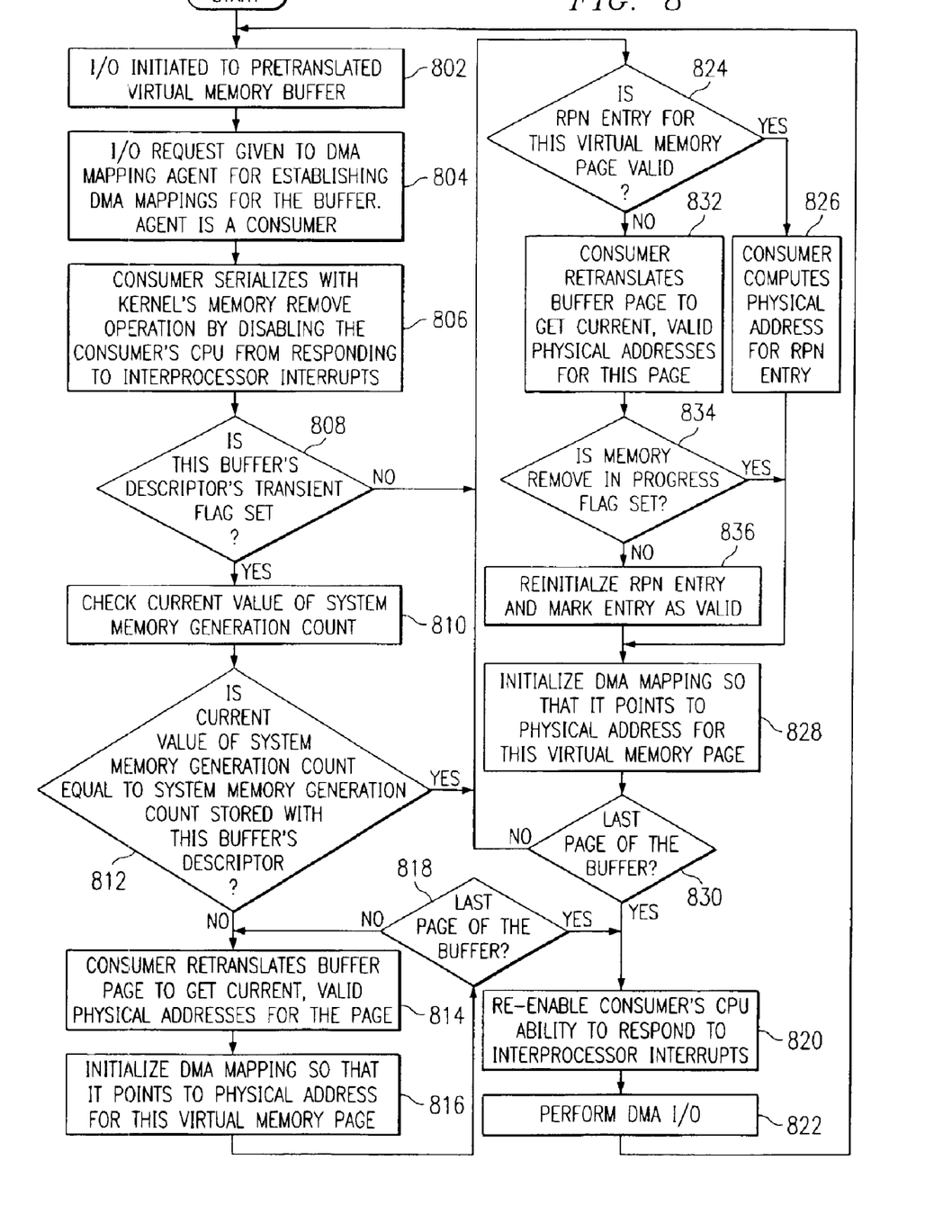
FIG. 8 illustrates a high level flow chart which depicts establishing a direct memory access (DMA) mapping of a virtual buffer to physical addresses in accordance with the present invention.

FIG. 8 illustrates a high level flow chart which depicts establishing a direct memory access (DMA) mapping of a virtual buffer to physical addresses in accordance with the present invention. The process starts as depicted by block 800 and thereafter passes to block 802 which illustrates I/O being initiated to a pretranslated virtual memory buffer. Next, block 804 depicts the I/O request being given to a DMA mapping agent which will establish DMA mappings for the buffer. The DMA mapping agent, thus, becomes a "consumer". DMA mapping is the act of determining what I/O bus address should be used by an I/O DMA engine in order to read or write memory corresponding to some physical memory address. For example, in some platforms, this mapping is one-to-one, meaning that the I/O DMA address is equal to the physical memory address. The act of DMA mapping in that kind of platform might be just providing the physical memory address. In other platforms, a DMA mapping goes through an I/O page table, which converts an I/O virtual address to a physical memory address. The act of DMA mapping in these platforms would be entering the physical memory address into the I/O page table and providing the resulting I/O virtual address.

The process then passes to block 806 which illustrates the consumer, the DMA mapping agent, serializing with the kernel's memory remove operation by disabling the consumer's CPU from responding to interprocessor interrupts. While a CPU is disabled from responding to an interrupt, it will not be able to transmit an acknowledgment of the interrupt. Once the CPU is no longer disabled, the CPU will transmit an acknowledgment of the interrupt.

Thereafter, block 808 depicts a determination of whether or not this buffer's descriptor's transient flag is set. If a determination is made that the transient flag for this buffer is not set in the buffer's descriptor, the process passes to block 824. Referring again to block 808, if a determination is made that the transient flag for this buffer is set in the buffer's descriptor, the process passes to block 810 which illustrates checking the current value of the system memory generation count. Next, block 812 depicts a determination of whether or not the current value of the system memory generation count is equal to the value of the system memory generation count that is stored with this buffer's descriptor. If a determination is made that the current value of the count is equal to the stored value of the count, the process passes to block 824. The current value will equal the stored value when no memory operation of a particular type has been performed since the time the stored count was stored.

Referring again to block 812, if a determination is made that the current value of the count is not equal to the stored value of the count, the process passes to block 814 which illustrates the consumer retranslating the buffer page to get the current, valid physical addresses for this page. Thereafter, block 816 depicts initializing the DMA mapping by storing the current pretranslations in the DMA mapping so that the mapping points to the current physical address for this virtual buffer page.

The process then passes to block 818 which illustrates a determination of whether or not this is the last page of the buffer. If a determination is made that this is not the last page of the buffer, the process passes back to block 814 to continue storing pretranslations for each page of the buffer. Referring again to block 818, if a determination is made that this is the last page of the buffer, the process passes to block 820 which depicts re-enabling the consumer's ability to respond to interprocessor interrupts. Thereafter, block 822 illustrates performing the DMA I/O. The process then passes back to block 802.

Block 824 depicts a determination of whether or not the entry in the RPN list for this virtual memory page is valid. If a determination is made that the entry in the RPN list for this page is valid, the process passes to block 826 which illustrates the consumer computing a physical address for the virtual address stored in the RPN entry. Next, block 828 depicts initializing the DMA mapping by storing this computed physical address in the mapping so that the mapping points to this physical address for this virtual page. Thereafter, block 830 illustrates a determination of whether or not this is the last page of the buffer. If a determination is made that this is the last page, the process passes to block 820. Referring again to block 830, if a determination is made that this is not the last page, the process passes back to block 824.

Referring again to block 824, if a determination is made that the entry in the RPN list for this page is not valid, the process passes to block 832 which depicts the consumer retranslating the buffer page to get the current, valid physical addresses for this page. Next, block 834 illustrates a determination of whether or not the "memory remove in progress" flag is set. If a determination is made that the memory remove in progress flag is set, the process passes to block 828. Referring again to block 834, if a determination is made that the memory remove in progress flag is not set, the process passes to block 836 which depicts reinitializing the RPN entry and marking it as being valid. The process then passes to block 828.

Figure 9:
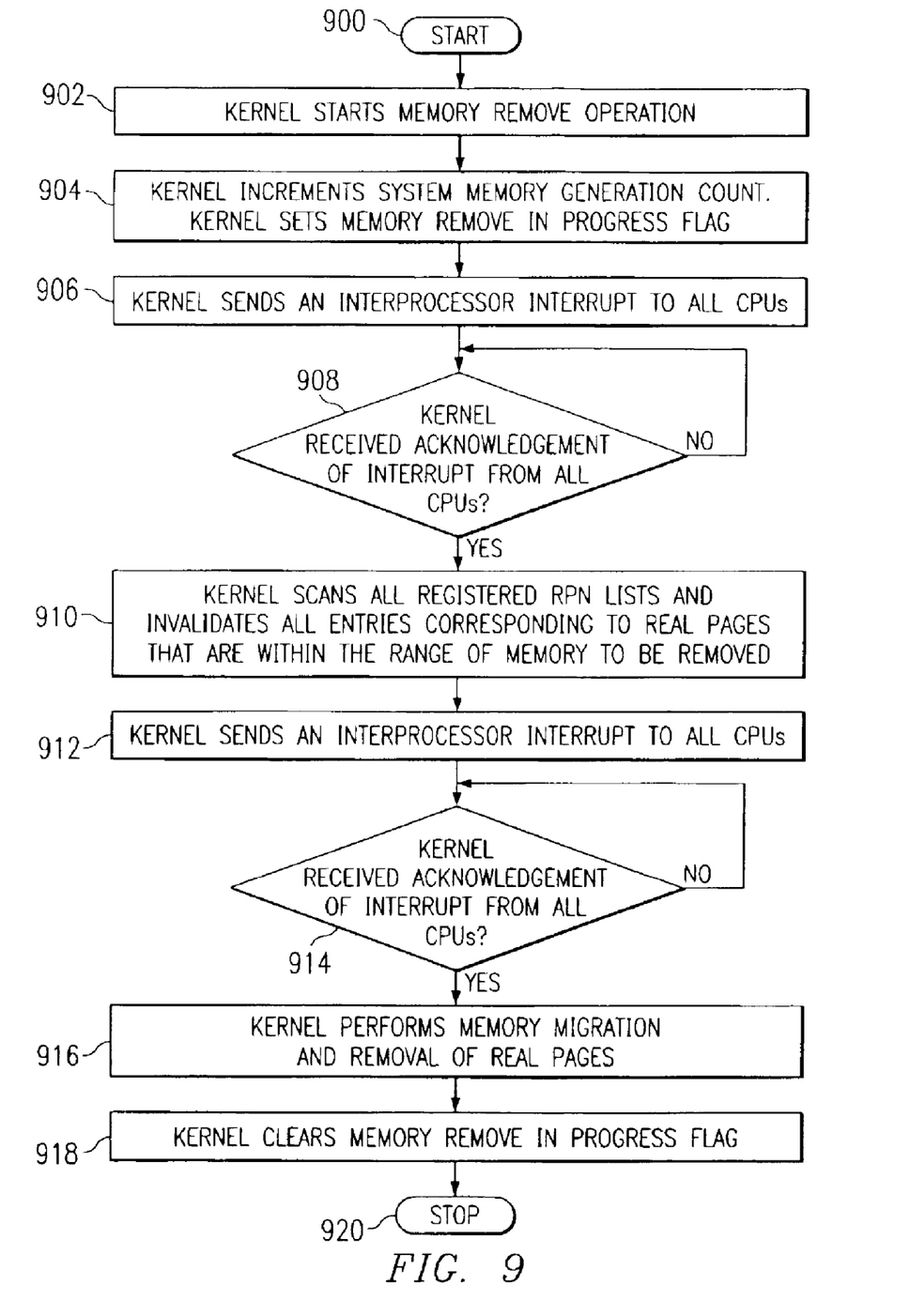
FIG. 9 depicts a high level flow chart which illustrates a kernel removing real pages of memory in accordance with the present invention.

FIG. 9 depicts a high level flow chart which illustrates a kernel removing real pages of memory in accordance with the present invention. The process starts as depicted by block 900 and thereafter passes to block 902 which illustrates the kernel starting a memory remove operation. Next, block 904 depicts the kernel atomically incrementing the system memory generation count. The kernel then sets the memory remove in progress flag.

The process then passes to block 906 which illustrates the kernel sending an interprocessor interrupt to all CPUs. Next, block 908 depicts a determination of whether or not the kernel received an acknowledgment of the interrupt from all of the CPUs. If a determination is made that the kernel did not receive an acknowledgment of the interrupt from all of the CPUs, the process passes back to block 908. If a determination is made that the kernel did receive an acknowledgment of the interrupt from all of the CPUs, the process passes to block 910 which illustrates the kernel scanning all registered RPN lists and invalidating all entries that correspond to real pages that are within the range of memory to be removed.

Block 912, then, depicts the kernel sending an interprocessor interrupt to all CPUs. Next, block 914 illustrates a determination of whether or not the kernel has received an acknowledgment of the interrupt from all CPUs. If a determination is made that the kernel has not received an acknowledgment from all CPUs, the process passes back to block 914. If a determination is made that the kernel has received an acknowledgment from all CPUs, the process passes to block 916 which depicts the kernel performing memory migration and removal of real pages of memory. Thereafter, block 918 illustrates the kernel clearing the memory remove in progress flag. The process then terminates as depicted by block 920.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for invalidating specified pretranslations maintained in a data processing system which maintains decentralized copies of pretranslations, said method comprising the steps of:

maintaining a centralized mapping of virtual addresses to their associated physical addresses, said centralized mapping including a listing of translations of said virtual addresses to said physical addresses;

generating a plurality of lists of pretranslations, each one of said plurality of lists including a copy of pretranslations for a first plurality of said virtual addresses;

wherein control of said plurality of lists is capable of being passed from one entity to another, wherein said plurality of lists are not owned by any particular entity;

specifying a particular one of said physical addresses;

locating each one of said plurality of lists which includes a pretranslation of a particular virtual address to said particular one of said physical addresses; and invalidating said pretranslation of said particular virtual address to said particular one of said physical addresses within each one of said plurality of lists.

2. The method according to claim 1, further comprising the step of:

maintaining a centralized mapping within a kernel of virtual addresses to their associated physical addresses.

3. The method according to claim 1, further comprising the steps of:

establishing a plurality of different users of said virtual addresses;

creating a listing of pretranslations for each one of said plurality of different users, said listing including a copy of pretranslations for a second plurality of virtual addresses, wherein said second plurality of virtual addresses are used by said each one of said plurality of different user; and maintaining said listing for each one of said plurality of users with said each one of said plurality of users, wherein each one of said plurality of users maintains its own copy of said listing of pretranslations.

4. The method according to claim 1, further comprising the steps of:

receiving a request within a kernel to register a particular listing of pretranslations;

receiving information by said kernel about said particular listing; and storing, by said kernel, information about said particular listing, wherein said particular listing is registered with said kernel.

5. The method according to claim 1, further comprising the steps of:

maintaining a registry within a kernel of each one of said plurality of lists.

6. The method according to claim 5, further comprising the steps of:

receiving a request to allocate memory for storing a listing;

allocating memory for storing said listing; and maintaining information about said listing in said registry.

7. A method for invalidating specified pretranslations maintained in a data processing system which maintains decentralized copies of pretranslations, said method comprising the steps of:

maintaining a centralized mapping of virtual addresses to their associated physical addresses, said centralized mapping including a listing of translations of said virtual addresses to said physical addresses;

generating a plurality of lists of pretranslations, each one of said plurality of lists including a copy of pretranslations for a first plurality of said virtual addresses;

wherein control of said plurality of lists is capable of being passed from one entity to another, wherein said plurality of lists are not owned by any particular entity;

specifying a particular one of said physical addresses;

locating each one of said plurality of lists which includes a pretranslation of a particular virtual address to said particular one of said physical addresses;

invalidating said pretranslation of said particular virtual address to said particular one of said physical addresses within each one of said plurality of lists;

maintaining a system memory generation count;

incrementing said system memory generation count in response to particular types of memory operations being executed; and recording a copy of a current value of said system memory generation count in response to each generation of one of said plurality of lists of pretranslations.

8. The method according to claim 7, further comprising the steps of:

receiving, by a processor, a request to access a pretranslation stored in one of said plurality of lists;

disabling, by said processor, an ability of said processor to respond to interrupts;

accessing said pretranslation stored in one of said plurality of lists; and re-enabling said ability of said processor to respond to interrupts.

9. The method according to claim 7, further comprising the steps of:
receiving, by a processor, a request to access a pretranslation of a virtual address to a particular physical address stored in one of said plurality of lists;
determining whether said pretranslation has been invalidated;
in response to a determination that said pretranslation has been invalidated, determining a new pretranslation of a virtual address to said particular physical address;
storing said new pretranslation in said one of said plurality of lists; and
accessing said new pretranslation.

10. The method according to claim 7, further comprising the steps of:
specifying a plurality of said physical addresses;
locating each one of said plurality of lists which includes a pretranslation of a virtual address to said specified plurality of said physical addresses; and
invalidating said pretranslations of a virtual address to said specified plurality of physical addresses.

11. The method according to claim 7, further comprising the steps of:
removing a plurality of physical addresses; and
invalidating only those pretranslations within each one of said plurality of lists that include one of said plurality of physical addresses that is being removed, wherein other pretranslations in each of said plurality of lists remain valid.

12. The method according to claim 7, further comprising the steps of:
specifying a plurality of said physical addresses;
locating each one of said plurality of lists which includes a pretranslation of a virtual address to said specified plurality of said physical addresses; and
invalidating an indefinite number of pretranslations, said invalidated pretranslations including said specified plurality of physical addresses.

13. The method according to claim 7, further comprising the step of:
asynchronously accessing said plurality of lists by an indefinite number of users.

14. The method according to claim 7, further comprising the step of:
invalidating said pretranslation without utilizing a lock or semaphore.

15. The method according to claim 7, further comprising the step of:
automatically repopulating each one of said plurality of lists with a new pretranslation in response to a next attempted access of said invalidated pretranslation in one of said plurality of lists.

16. The method according to claim 7, further comprising the steps of:
marking one of said plurality of lists as transient when one of said plurality of lists is to be used only once; and
excluding ones of said plurality of lists that are marked as transient from said invalidation process.

17. The method according to claim 7, further comprising the steps of:
starting a memory remove operation by specifying a physical address to be removed;
locating each one of said plurality of lists which includes a pretranslation of a particular virtual address to said physical address to be removed;
sending, by a kernel, an interrupt to other processors in said system;
waiting until said kernel receives an acknowledgment of said interrupt from each of said other processors;
in response to said kernel receiving an acknowledgment of said interrupt from each of said other processors, invalidating said pretranslation of said particular virtual address to said physical address to be remove within each one of said plurality of lists; and
removing said physical address.

18. The method according to claim 17, further comprising the step of:
determining a validity of a pretranslation utilizing said copy of said system memory generation count.

19. The method according to claim 17, further comprising the steps of:
marking one of said plurality of lists as transient when said one of said plurality of lists is to be used only once;
determining a validity of a pretranslation by comparing said copy of said system memory generation count recorded with said one of said plurality of lists to a current value of said system memory generation count; and
in response to a determination that said copy does not match said current value, determining that pretranslations stored in said one of said plurality of lists are invalid.

20. A data processing system for invalidating specified pretranslations maintained in the data processing system, wherein the system maintains decentralized copies of pretranslations, comprising:
a centralized mapping of virtual addresses to their associated physical addresses, said centralized mapping including a listing of translations of said virtual addresses to said physical addresses;
a plurality of lists of pretranslation, each one of said plurality of lists including a copy of pretranslations for a first plurality of said virtual addresses;
wherein control of said plurality of lists is capable of being passed from one entity to another, wherein said plurality of lists are not owned by any particular entity;
a particular one of said physical addresses being specified;
locating means for locating each one of said plurality of lists which includes a pretranslation of a particular virtual address to said particular one of said physical addresses; and
invalidating means for invalidating said pretranslation of said particular virtual address to said particular one of said physical addresses within each one of said plurality of lists.

21. The system according to claim 20, further comprising:
a centralized mapping within a kernel of virtual addresses to their associated physical addresses.

22. The system according to claim 20, further comprising:
a plurality of different users of said virtual addresses;
creating means for creating a listing of pretranslations for each one of said plurality of different users, said listing including a copy of pretranslations for a second plurality of virtual addresses, wherein said second plurality of virtual addresses are used by said each one of said plurality of different user; and
said listing being maintained for each one of said plurality of users with said each one of said plurality of users, wherein each one of said plurality of users maintains its own copy of said listing of pretranslations.

23. The system according to claim 20, further comprising:
a request being received within a kernel to register a particular listing of pretranslations;
receiving means for receiving information by said kernel about said particular listing; and
said kernel for storing information about said particular listing, wherein said particular listing is registered with said kernel.

24. The system according to claim 20, further comprising:
a registry maintained within a kernel of each one of said plurality of lists.

25. The system according to claim 24, further comprising:
a request being received to allocate memory for storing a listing;
allocating means for allocating memory for storing said listing; and
information being maintained about said listing in said registry.

26. A data processing system for invalidating specified pretranslations maintained in the data processing system, wherein the system maintains decentralized copies of pretranslations, comprising:
a centralized mapping of virtual addresses to their associated physical addresses, said centralized mapping including a listing of translations of said virtual addresses to said physical addresses;
a plurality of lists of pretranslations, each one of said plurality of lists including a copy of pretranslations for a first plurality of said virtual addresses;
wherein control of said plurality of lists is capable of being passed from one entity to another, wherein said plurality of lists are not owned by any particular entity;
a particular one of said physical addresses being specified;
locating means for locating each one of said plurality of lists which includes a pretranslation of a particular virtual address to said particular one of said physical addresses;
invalidating means for invalidating said pretranslation of said particular virtual address to said particular one of said physical addresses within each one of said plurality of lists;
a system memory generation count being maintained;
incrementing means for incrementing said system memory generation count in response to particular types of memory operations being executed; and
recording means for recording a copy of a current value of said system memory generation count in response to each generation of one of said plurality of lists of pretranslations.

27. The system according to claim 26, further comprising:
a processor for receiving a request to access a pretranslation stored in one of said plurality of lists;
said processor for disabling an ability of said processor to respond to interrupts;
accessing means for accessing said pretranslation stored in one of said plurality of lists; and
re-enabling means for re-enabling said ability of said processor to respond to interrupts.

28. The system according to claim 26, further comprising:
a processor for receiving a request to access a pretranslation of a virtual address to a particular physical address stored in one of said plurality of lists;
determining means for determining whether said pretranslation has been invalidated;
in response to a determination that said pretranslation has been invalidated, determining means for determining a new pretranslation of a virtual address to said particular physical address;
storing means for storing said new pretranslation in said one of said plurality of lists; and
accessing means for accessing said new pretranslation.

29. The system according to claim 26, further comprising:
specifying means for specifying a plurality of said physical addresses;
locating means for locating each one of said plurality of lists which includes a pretranslation of a virtual address to said specified plurality of said physical addresses; and
invalidating means for invalidating said pretranslations of a virtual address to said specified plurality of physical addresses.

30. The system according to claim 26, further comprising:
removing means for removing a plurality of physical addresses; and
invalidating means for invalidating only those pretranslations within each one of said plurality of lists that include one of said plurality of physical addresses that is being removed, wherein other pretranslations in each of said plurality of lists remain valid.

31. The system according to claim 26, further comprising:
specifying means for specifying a plurality of said physical addresses;
locating means for locating each one of said plurality of lists which includes a pretranslation of a virtual address to said specified plurality of said physical addresses; and
invalidating means for invalidating an indefinite number of pretranslations, said invalidated pretranslations including said specified plurality of physical addresses.

32. The system according to claim 26, further comprising:
accessing means for asynchronously accessing said plurality of lists by an indefinite number of users.

33. The system according to claim 26, further comprising:
invalidating means for invalidating said pretranslation without utilizing a lock or semaphore.

34. The system according to claim 26, further comprising:
repopulating means for automatically repopulating each one of said plurality of lists with a new pretranslation in response to a next attempted access of said invalidated pretranslation in one of said plurality of lists.

35. The system according to claim 26, further comprising:
marking means for marking one of said plurality of lists as transient when one of said plurality of lists is to be used only once; and
excluding means for excluding ones of said plurality of lists that are marked as transient from said invalidation process.

36. The system according to claim 26, further comprising:
starting means for starting a memory remove operation by specifying a physical address to be removed;
locating means for locating each one of said plurality of lists which includes a pretranslation of a particular virtual address to said physical address to be removed;
a kernel for sending an interrupt to other processors in said system;
waiting means for waiting until said kernel receives an acknowledgment of said interrupt from each of said other processors;

in response to said kernel receiving an acknowledgment of said interrupt from each of said other processors, invalidating means for invalidating said pretranslation of said particular virtual address to said physical address to be removed within each one of said plurality of lists; and removing means for removing said physical address.

37. The system according to claim 36, further comprising:

determining means for determining a validity of a pretranslation utilizing said copy of said system memory generation count.

38. The system according to claim 36, further comprising:

marking means for marking one of said plurality of lists as transient when said one of said plurality of lists is to be used only once;

determining means for determining a validity of a pretranslation by comparing said copy of said system memory generation count recorded with said one of said plurality of lists to a current value of said system memory generation count; and in response to a determination that said copy does not match said current value, determining means for determining that pretranslations stored in said one of said plurality of lists are invalid.

39. A computer program product for invalidating specified pretranslations maintained in a data processing system which maintains decentralized copies of pretranslations, said product comprising:

instruction means for maintaining a centralized mapping of virtual addresses to their associated physical addresses, said centralized mapping including a listing of translations of said virtual addresses to said physical addresses;

instruction means for generating a plurality of lists of pretranslations, each one of said plurality of lists including a copy of pretranslations for a first plurality of said virtual addresses;

wherein control of said plurality of lists is capable of being passed from one entity to another, wherein said plurality of lists are not owned by any particular entity;

instruction means for specifying a particular one of said physical addresses;

instruction means for locating each one of said plurality of lists which includes a pretranslation of a particular virtual address to said particular one of said physical addresses; and instruction means for invalidating said pretranslation of said particular virtual address to said particular one of said physical addresses within each one of said plurality of lists.

40. The product according to claim 39, further comprising:

instruction means for maintaining a centralized mapping within a kernel of virtual addresses so their associated physical addresses.

41. The product according to claim 39, further comprising:

instruction means for establishing a plurality of different users of said virtual addresses;

instruction means for creating a listing of pretranslations for each one of said plurality of different users, said listing including a copy of pretranslations for a second plurality of virtual addresses, wherein said second plurality of virtual addresses are used by said each one of said plurality of different user; and instruction means for maintaining said listing for each one of said plurality of users with said each one of said plurality of users, wherein each one of said plurality of users maintains its own copy of said listing of pretranslations.

42. The product according to claim 39, further comprising:

instruction means for receiving a request within a kernel to register a particular listing of pretranslations;

instruction means for receiving information by said kernel about said particular listing; and instruction means for storing, by said kernel, information about said particular listing, wherein said particular listing is registered with said kernel.

43. The product according to claim 39, further comprising:

instruction means for maintaining a registry within a kernel of each one of said plurality of lists.

44. The product according to claim 43, further comprising:

instruction means for receiving a request to allocate memory for storing a listing;

instruction means for allocating memory for storing said listings; and instruction means for maintaining information about said listing in said registry.

45. A computer program product for invalidating specified pretranslations maintained in a data processing system which maintains decentralized copies of pretranslations, said product comprising:

instruction means for maintaining a centralized mapping of virtual addresses to their associated physical addresses, said centralized mapping including a listing of translations of said virtual addresses to said physical addresses;

instruction means for generating a plurality of lists of pretranslations, each one of said plurality of lists including a copy of pretranslations for a first plurality of said virtual addresses;

wherein control of said plurality of list is capable of being passed from one entity to another, wherein said plurality of lists are not owned by any particular entity;

instruction means for specifying a particular one of said physical addresses;

instruction means for locating each one of said plurality of lists which includes a pretranslation of a particular virtual address to said particular one of said physical addresses;

instruction means for invalidating said pretranslation of said particular virtual address to said particular one of said physical addresses within each one of said plurality of lists;

instruction means for maintaining a system memory generation count;

instruction means for incrementing said system memory generation count in response to particular types of memory operations being executed; and instruction means for recording a copy of a current value of said system memory generation count in response to each generation of one of said plurality of lists of pretranslations.

46. The product according to claim 45, further comprising:

instruction means for receiving, by a processor, a request to access a pretranslation stored in one of said plurality of lists;

instruction means for disabling, by said processor, an ability of said processor to respond to interrupts;

instruction means for accessing said pretranslation stored in one of said plurality of lists; and instruction means for re-enabling said ability of said processor to respond to interrupts.

47. The product according to claim 45, further comprising:

instruction means for receiving, by a processor, a request to access a pretranslation of a virtual address to a particular physical address stored in one of said plurality of lists;

instruction means for determining whether said pretranslation has been invalidated;

in response to a determination that said pretranslation has been invalidated, instruction means for determining a new pretranslation of a virtual address to said particular physical address;

instruction means for storing said new pretranslation in said one of said plurality of lists; and instruction means for accessing said new pretranslation.

48. The product according to claim 45, further comprising:

instruction means for specifying a plurality of said physical addresses;

instruction means for locating each one of said plurality of lists which includes a pretranslation of a virtual address to said specified plurality of said physical addresses; and instruction means for invalidating said pretranslations of a virtual address to said specified plurality of physical addresses.

49. The product according to claim 45, further comprising:

instruction means for removing a plurality of physical addresses; and instruction means for invalidating only those pretranslations within each one of said plurality of lists that include one of said plurality of physical addresses that is being removed, wherein other pretranslations in each of said plurality of lists remain valid.

50. The product according to claim 45, further comprising:

instruction means for specifying a plurality of said physical addresses;

instruction means for locating each one of said plurality of lists which includes a pretranslation of a virtual address to said specified plurality of said physical addresses; and instruction means far invalidating an indefinite number of pretranslations, said invalidated pretranslations including said specified plurality of physical addresses.

51. The product according to claim 45, further comprising:

instruction means for asynchronously accessing said plurality of lists by an indefinite number of users.

52. The product according to claim 45, further composing:

instruction means for invalidating said pretranslation without utilizing a lock or semaphore.

53. The product according to claim 45, further comprising:

instruction means for automatically repopulating each one of said plurality of lists with a new pretranslation in response to a next attempted access of said invalidated pretranslation in one of said plurality of lists.

54. The product according to claim 45, further comprising:

instruction means for marking one of said plurality of lists as transient when one of said plurality of lists is to be used only once; and instruction means for excluding ones of said plurality of lists that are marked as transient from said invalidation process.

55. The product according to claim 45, further comprising:

instruction means for starting a memory remove operation by specifying a physical address to be removed;

instruction means for locating each one of said plurality of lists which includes a pretranslation of a particular virtual address to said physical address to be removed;

instruction means for sending, by said kernel, an interrupt to other processors in said system;

instruction means for waiting until said kernel receives an acknowledgment of said interrupt from each of said other processors;

in response to said kernel receiving an acknowledgment of said interrupt from each of said other processors, instruction means for invalidating said pretranslation of said particular virtual address to said physical address to be removed within each one of said plurality of lists; and instruction means for removing said physical address.

56. The product according to claim 55, further comprising:

instruction means for determining a validity of a pretranslation utilizing said copy of said system memory generation count.

57. The product according to claim 55, further comprising:

instruction means for marking one of said plurality of lists as transient when said one of said plurality of lists is to be used only once;

instruction means for determining a validity of a pretranslation by comparing said copy of said system memory generation count recorded with said one of said plurality of lists to a current value of said system memory generation count; and in response to a determination that said copy does not match said current value, instruction means for determining that pretranslations stored in said one of said plurality of lists are invalid.

* * * * *